(12) United States Patent
Tsujimura

(10) Patent No.: US 12,058,441 B2
(45) Date of Patent: Aug. 6, 2024

(54) INFORMATION PROCESSING APPARATUS WITH AUTOMATIC ADJUSTMENT OF FOCAL POINT

(71) Applicant: SONY GROUP CORPORATION, Tokyo (JP)

(72) Inventor: Takashi Tsujimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 23 days.

(21) Appl. No.: 17/753,882

(22) PCT Filed: Jul. 13, 2020

(86) PCT No.: PCT/JP2020/027288
§ 371 (c)(1),
(2) Date: Mar. 17, 2022

(87) PCT Pub. No.: WO2021/059679
PCT Pub. Date: Apr. 1, 2021

(65) Prior Publication Data
US 2023/0353872 A1    Nov. 2, 2023

(30) Foreign Application Priority Data
Sep. 27, 2019    (JP) .................................. 2019-176855

(51) Int. Cl.
*H04N 23/67* (2023.01)
*G06T 7/70* (2017.01)
(Continued)

(52) U.S. Cl.
CPC ............. *H04N 23/675* (2023.01); *G06T 7/70* (2017.01); *G06V 10/774* (2022.01); *H04N 23/61* (2023.01); *G06T 2207/20081* (2013.01)

(58) Field of Classification Search
CPC ........ H04N 23/675; H04N 23/61; G06T 7/70; G06T 2207/20081; G06V 10/774
See application file for complete search history.

(56) References Cited

U.S. PATENT DOCUMENTS

| 4,965,443 A | 10/1990 | Yamasaki et al. |
| 2012/0044354 A1 | 2/2012 | Cheng et al. |

(Continued)

FOREIGN PATENT DOCUMENTS

| CN | 109076356 A | 12/2018 |
| CN | 109698901 A | 4/2019 |

(Continued)

OTHER PUBLICATIONS

Tian Guo, "Cloud-based or On-device: An Empirical Study of Mobile Deep Inference", International Conference on Cloud Engineering (IC2E) conference, IEEE, XP081312516, Jul. 14, 2017, 07 pages.

(Continued)

*Primary Examiner* — Twyler L Haskins
*Assistant Examiner* — Angel L Garces-Rivera
(74) *Attorney, Agent, or Firm* — CHIP LAW GROUP

(57) ABSTRACT

An information processing apparatus collects image data, performs a training process using the image data to create a trained model for autofocus (AF), and outputs the trained model to a requesting device. A terminal apparatus includes a communication function, and acquires the trained model output by the information processing apparatus. An electronic device includes an imaging function, acquires the trained model from the terminal apparatus, and performs autofocus on the basis of the trained model. When the electronic device performs autofocus to capture an image of an object and an intended spot is not automatically in-focus, a user registers the image data (out-of-focus image data) in (Continued)

the terminal apparatus. An AF point is designated in the out-of-focus image data. The information processing apparatus collects the out-of-focus image data from the terminal apparatus, and performs the training process using the out-of-focus image data to create and output the trained model.

17 Claims, 13 Drawing Sheets

(51) Int. Cl.
*G06V 10/774* (2022.01)
*H04N 23/61* (2023.01)

(56) References Cited

U.S. PATENT DOCUMENTS

| 2013/0169853 A1 | 7/2013 | Luong |
| 2013/0243308 A1 | 9/2013 | Wang |
| 2013/0300917 A1 | 11/2013 | Yata |
| 2019/0132520 A1 | 5/2019 | Gupta |

FOREIGN PATENT DOCUMENTS

| CN | 109963072 A | 7/2019 |
| DE | 102018219867 A1 | 5/2020 |
| JP | 02-096707 A | 4/1990 |
| JP | 2761391 B2 | 6/1998 |
| JP | 2017-005443 A | 1/2017 |
| WO | 2020/104521 A2 | 5/2020 |

OTHER PUBLICATIONS

Figueroa, et al., "Predicting sample size required for classification performance", BMC Medical Informatics and Decision Making, Feb. 15, 2012, 10 Pages.

International Search Report and Written Opinion of PCT Application No. PCT/JP2020/027288, issued on Oct. 20, 2020, 16 pages of ISRWO.

INFORMATION PROCESSING APPARATUS WITH AUTOMATIC ADJUSTMENT OF FOCAL POINT

CROSS REFERENCE TO RELATED APPLICATIONS

This application is a U.S. National Phase of International Patent Application No. PCT/JP2020/027288 filed on Jul. 13, 2020, which claims priority benefit of Japanese Patent Application No. JP 2019-176855 filed in the Japan Patent Office on Sep. 27, 2019. Each of the above-referenced applications is hereby incorporated herein by reference in its entirety.

TECHNICAL FIELD

The present disclosure relates to an information processing apparatus, an electronic device, a terminal apparatus, an information processing system, an information processing method, and a program.

BACKGROUND ART

Electronic devices as typified by devices such as digital cameras and digital video cameras include an onboard imaging apparatus such as a charge-coupled device (CCD) or complementary metal-oxide semiconductor (CMOS) image sensor, for example. The imaging apparatus has an autofocus (AF) function that adjusts the focal point automatically. With autofocus, driving a lens causes the focal point to be adjusted appropriately, making it possible to acquire a focus-adjusted (in-focus) image.

CITATION LIST

Patent Literature

[PTL 1]
  JP 2017-005443 A

SUMMARY OF INVENTION

Technical Problem

However, with autofocus of the related art, depending on the object in question, the focal point is not necessarily adjusted automatically to a user's desired spot. In this case, the user must perform operations for adjusting the focal point when shooting, and the user is unable to take a shot while concentrating on the composition and the right moment. For this reason, there is demand for a technology that improves the autofocus function such that the focal point is adjusted automatically to the user's desired spot without the user having to perform operations for focal point adjusting while shooting.

Accordingly, the present disclosure proposes an information processing apparatus, an electronic device, a terminal apparatus, an information processing system, an information processing method, and a program capable of improving the autofocus function.

Solution to Problem

An information processing apparatus according to the present disclosure includes: a collection unit that collects image data; a training unit that uses a plurality of the image data collected by the collection unit to extract an object position included in the image data, perform a training process regarding a relationship between the image data and the object position, and create a trained model for automatic focal point adjustment that specifies an object from the image data to specify a focal position; and an output unit that outputs the trained model created by the training unit to a device requesting the trained model.

An electronic device according to the present disclosure includes: a storage unit that stores a trained model for automatic focal point adjustment; a control unit that performs automatic focal point adjustment on a basis of the trained model stored in the storage unit; and an optical system that brings into focus a predetermined part of an object according to control by the control unit.

A terminal apparatus according to the present disclosure includes: a communication unit capable of communicating with an information processing apparatus; a control unit that acquires a trained model for automatic focal point adjustment from the information processing apparatus through the communication unit; and a provision unit that provides the trained model acquired from the information processing apparatus to an electronic device that performs automatic focal point adjustment on a basis of the trained model.

An information processing system according to the present disclosure includes: an information processing apparatus that collects image data, uses a plurality of the collected image data to extract an object position included in the image data, performs a training process regarding a relationship between the image data and the object position, creates a trained model for automatic focal point adjustment that specifies an object from the image data to specify a focal position, and outputs the trained model to a device requesting the trained model; a terminal apparatus that acquires the trained model from the information processing apparatus; and an electronic device that acquires the trained model from the terminal apparatus and performs automatic focal point adjustment on a basis of the trained model.

An information processing system according to the present disclosure includes: an information processing apparatus that collects image data, uses a plurality of the collected image data to extract an object position included in the image data, performs a training process regarding a relationship between the image data and the object position, creates a trained model for automatic focal point adjustment that specifies an object from the image data to specify a focal position, and outputs the trained model to a device requesting the trained model; and an electronic device that acquires the trained model from the information processing apparatus and performs automatic focal point adjustment on a basis of the trained model.

An information processing method according to the present disclosure includes: collecting image data; using a plurality of the collected image data to extract an object position included in the image data, perform a training process regarding a relationship between the image data and the object position, and create a trained model for automatic focal point adjustment that specifies an object from the image data to specify a focal position; and outputting the created trained model to a device requesting the trained model.

A program according to the present disclosure causes a computer to execute a process comprising: collecting image data; using a plurality of the collected image data to extract an object position included in the image data, perform a training process regarding a relationship between the image data and the object position, and create a trained model for automatic focal point adjustment of an electronic device that specifies an object from the image data to specify a focal position; and outputting the created trained model to a device requesting the trained model.

DESCRIPTION OF EMBODIMENTS

Hereinafter, exemplary embodiments of the present disclosure will be described in detail on the basis of the drawings. Note that in the following embodiments, the same portions are denoted with the same signs, and duplicate description is omitted.

Hereinafter, the description will proceed in the following order.

1. First Embodiment
  <1-1. Configuration of system according to first embodiment>
  <1-1-1. Configuration of electronic device according to first embodiment>
  <1-1-2. Configuration of terminal apparatus according to first embodiment>
  <1-1-3. Configuration of information processing apparatus according to first embodiment>
  <1-2. Procedure for installing trained model according to first embodiment>
  <1-3. Procedure for confirming shot image according to first embodiment>
  <1-4. Modification (1) of first embodiment>
  <1-4-1. AF point designation before uploading image data>
  <1-5. Modification (2) of first embodiment>
  <1-5-1. Semi-automated training>
2. Second Embodiment
  <2-1. Configuration of system according to second embodiment>
  <2-1-1. Configuration of electronic device according to second embodiment>
  <2-2. Procedure for installing trained model according to second embodiment>
<3. Conclusion>

1. First Embodiment 1-1. Configuration of System According to First Embodiment

Figure 1:
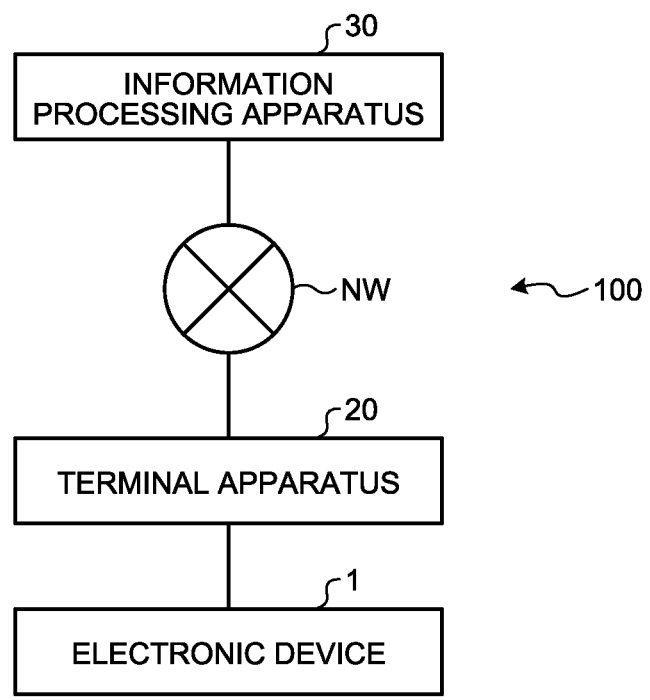
FIG. 1 is a block diagram illustrating one example of a configuration of an information processing system according to the first embodiment of the present disclosure.

FIG. 1 is a block diagram illustrating one example of a configuration of an information processing system according to the first embodiment of the present disclosure. As illustrated in FIG. 1, an information processing system 100 includes an electronic device 1, a terminal apparatus 20, and an information processing apparatus 30. The electronic device 1 and the terminal apparatus 20 exist on a user side, while the information processing apparatus 30 exists on a network side.

The electronic device 1 is a device having functions for shooting images, including still images and/or moving images. The electronic device 1 is a device such as a digital camera, a digital video camera, a web camera, or a smartphone, tablet, or portable game console with imaging functions, for example. The electronic device 1 may also be a device such as a surveillance camera, an in-vehicle camera, or a medical camera. The electronic device 1 has an autofocus (AF: automatic focal point adjustment) function, and automatically focuses on (brings into focus) an object when shooting. The electronic device 1 exchanges various data with the terminal apparatus 20 via a Universal Serial Bus (USB) or Secure Digital (SD) memory card, or by wired or wireless communication. The electronic device 1 according to the present embodiment receives a trained model MD for autofocus from the terminal apparatus 20. The electronic device 1 provides image data to the terminal apparatus 20.

The terminal apparatus 20 is a computer, such as a desktop personal computer (PC) or laptop, a smartphone, a tablet, AV equipment such as a digital TV or a video recorder and player, or a video game console (home console), for example. The terminal apparatus 20 is provided with functions such as computational functions, storage functions, output functions, and communication functions. The terminal apparatus 20 transmits and receives various data with the information processing apparatus 30 over a network NW. In the present embodiment, the terminal apparatus 20 downloads the trained model MD from the information processing apparatus 30. Also, the terminal apparatus 20 outputs the downloaded trained model MD to the electronic device 1. Also, the terminal apparatus 20 outputs image data to the information processing apparatus 30.

The information processing apparatus 30 is a server such as a PC server or a graphics processing unit (GPU) server, or alternatively a mainframe or a workstation, for example.

Additionally, the information processing apparatus 30 may be one of a plurality of servers that achieve distributed computing or cloud computing. The information processing apparatus 30 is more powerful than the electronic device 1 and the terminal apparatus 20. The information processing apparatus 30 provides various services to the electronic device 1 and the terminal apparatus 20 over the network NW. In the present embodiment, the information processing apparatus 30 publishes the trained model MD on the web in an accessible state over the network NW, and outputs to devices that have requested the trained model MD. Additionally, the information processing apparatus 30 is also capable of collecting various image data over the network NW.

1-1-1. Configuration of Electronic Device According to First Embodiment

Figure 2:
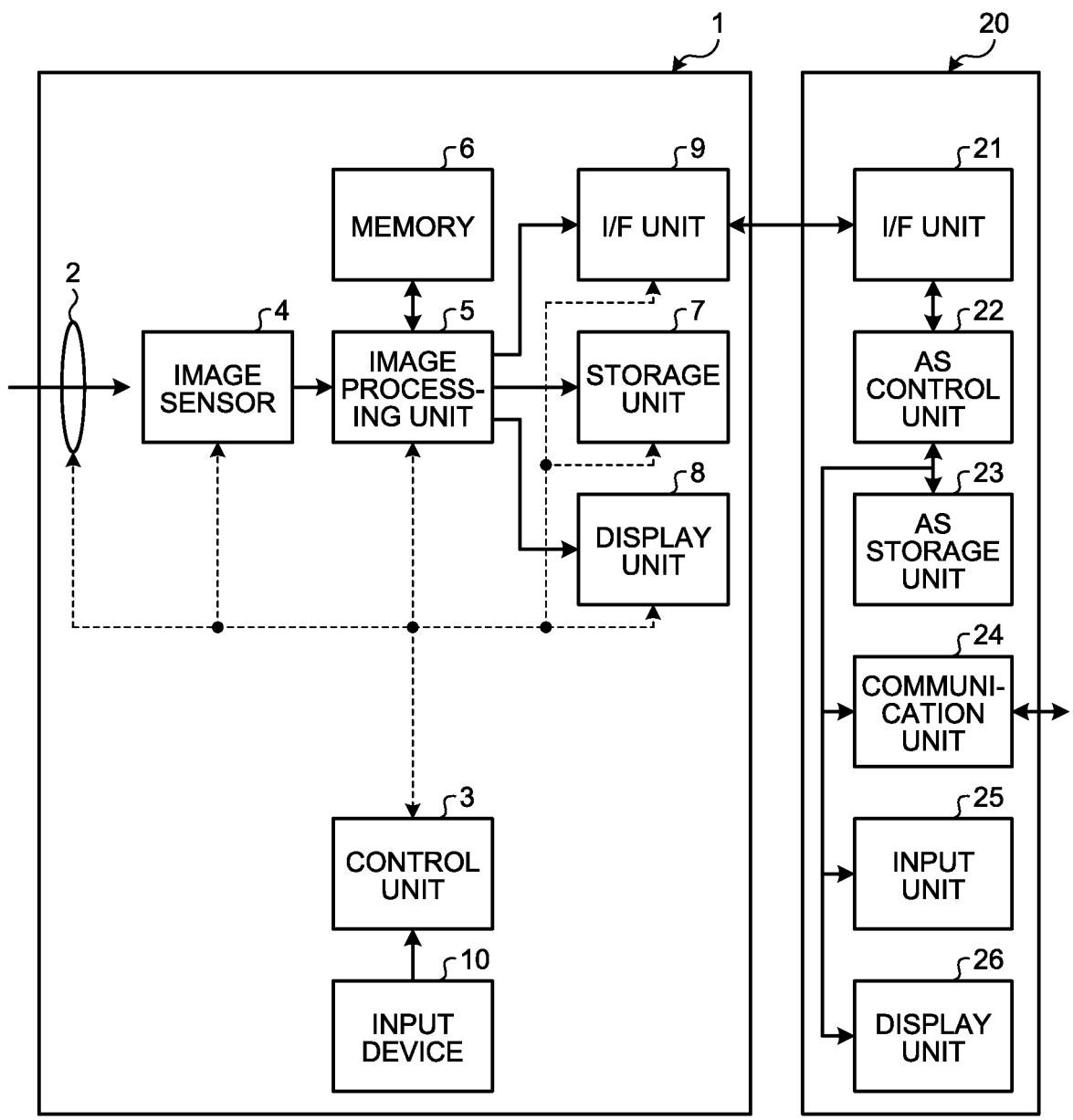
FIG. 2 is a block diagram illustrating one example of a configuration of an electronic device and a terminal apparatus according to the first embodiment of the present disclosure.

FIG. 2 is a block diagram illustrating one example of a configuration of an electronic device and a terminal apparatus according to the first embodiment of the present disclosure. As illustrated in FIG. 2, the electronic device 1 is provided with an optical system 2, a control unit 3, an image sensor 4, an image processing unit 5, memory 6, a storage unit 7, a display unit 8, an I/F unit 9, and an input device 10.

The optical system 2 includes a main lens including one or a plurality of lenses, and a mechanism for driving the main lens. The optical system 2 forms image light (incident light) from an object OBJ onto a photosensitive face of the image sensor 4 through the main lens. Also, the optical system 2 is provided with an autofocus mechanism that adjusts the focus according to a control signal, and a zoom mechanism that changes the zoom factor according to a control signal. Additionally, the optical system 2 may also be removable from the electronic device 1, and may be replaced with another optical system 2.

The image sensor 4 includes a plurality of photoelectric transducers disposed in a matrix of rows and columns for example. The photoelectric transducers convert received light into electric charge by photoelectric conversion. The image sensor 4 includes a driving circuit that drives the plurality of photoelectric transducers and a signal processing circuit that reads out the electric charge from each of the plurality of photoelectric transducers, and generates RAW data (unprocessed image data) on the basis of the read-out electric charge.

The image processing unit 5 is an image processing engine or the like for example, and executes predetermined image processing on the RAW data output from the image sensor 4. For example, the image processing unit 5 is connected to the memory 6 such as random access memory (RAM), and writes the RAW data output from the image sensor 4 to the memory 6. Also, the image processing unit 5 executes predetermined image processing on the RAW data written to the memory 6, and writes image data generated by the image processing to the memory 6. Additionally, in the case where the terminal apparatus 20 rather than the electronic device 1 executes predetermined image processing on the RAW data, the image processing unit 5 may also provide the RAW data to the terminal apparatus 20 through the I/F unit 9.

The storage unit 7 is non-volatile memory such as flash memory for example, and persistently stores RAW data or image data output from the image processing unit 5. The display unit 8 includes a display device using a display such as a liquid crystal display (LCD) or an organic electro-luminescence display (OELD) for example, and a driving circuit that drives the display device. The display unit 8 is capable of displaying images based on image data output from the image processing unit 5. The I/F unit 9 is an interface for exchanging various data with the terminal apparatus 20. For example, an interface such as a USB port or an SD memory card slot may be applied as the I/F unit 9. Additionally, the I/F unit 9 may also be an interface capable of communicating by wired or wireless communication. For example, the I/F unit 9 may also be an interface that supports a short-range wireless communication standard.

The input device 10 includes operable elements or the like for receiving user input. If the electronic device 1 is a device such as a digital camera, a digital video camera, or a smartphone, tablet, or portable game console with imaging functions for, the input device 10 may include a shutter button for instructing the image sensor 4 to execute imaging, or an operable element for achieving the function of a shutter button.

The control unit 3 is a processor such as a central processing unit (CPU) for example. The control unit 3 controls the overall operation of the electronic device 1 by following a program stored in advance in read-only memory (ROM) and using cache memory or RAM as working memory. Note that all or part of the control unit 3 may include hardware such as a system-on-a-chip (SoC), an application-specific integrated circuit (ASIC), or a field-programmable gate array (FPGA). For example, the control unit 3 is capable of controlling the operation of the electronic device 1 according to user input received by the input device 10. Also, the control unit 3 is capable of providing RAW data or image data stored in the storage unit 7 to the terminal apparatus 20 through the I/F unit 9. Also, the control unit 3 is capable of storing the trained model MD provided from the terminal apparatus 20 through the I/F unit 9 in the storage unit 7, and controlling the autofocus mechanism of the optical system 2 on the basis of the trained model MD stored in the storage unit 7.

1-1-2. Configuration of Terminal Apparatus According to First Embodiment

As illustrated in FIG. 2, the terminal apparatus 20 is provided with an I/F unit 21, an AS control unit 22, an AS storage unit 23, a communication unit 24, an input unit 25, and a display unit 26.

The I/F unit 21 is an interface for exchanging various data with the I/F unit 9 of the electronic device 1. In other words, the I/F unit 21 is an interface corresponding to the I/F unit 9. Examples of the I/F unit 21 are similar to the I/F unit 9.

The AS control unit 22 is a processor such as a CPU for example that controls the overall operation of the terminal apparatus 20 by following a program stored in advance in the AS storage unit 23 and using cache memory or RAM as working memory. Also, the AS control unit 22 executes special-purpose application software AS for exchanging image data with the information processing apparatus 30, and registers image data to upload to the information processing apparatus 30. Additionally, the AS control unit 22 downloads the trained model MD from the information processing apparatus 30.

The AS storage unit 23 is a storage device such as a solid-state drive (SSD) or a hard disk drive (HDD), or alternatively non-volatile memory such as flash memory, for example. The AS storage unit 23 stores information such as the special-purpose application software AS executed by the AS control unit 22 and image data to upload to the information processing apparatus 30. The AS storage unit 23 may be built into the terminal apparatus or may be an externally-attached storage apparatus. Additionally, the AS storage unit 23 may also be a combination of a storage medium such as an optical disc and an apparatus (drive) for driving the storage medium. For example, the special-purpose application software AS may be stored in a storage medium such as an optical disc.

The communication unit 24 is an interface capable of connecting to the network NW by wired or wireless communication. As the communication unit 24, a network adapter such as a network interface card (NIC), an antenna, and the like may be applied, for example.

The input unit 25 is an input apparatus such as a keyboard and mouse, a keypad, or other buttons for example. The input unit 25 outputs a signal corresponding to an input operation by a user to the AS control unit 22. In addition, the input unit 25 may also be a software key displayed on the display unit 26 and a touch panel linked to the display unit 26. The display unit 26 includes an image processing processor such as a GPU and a display apparatus such as an LCD or an OELD for example, and displays information such as images according to an output signal from the AS control unit 22.

Figure 3:
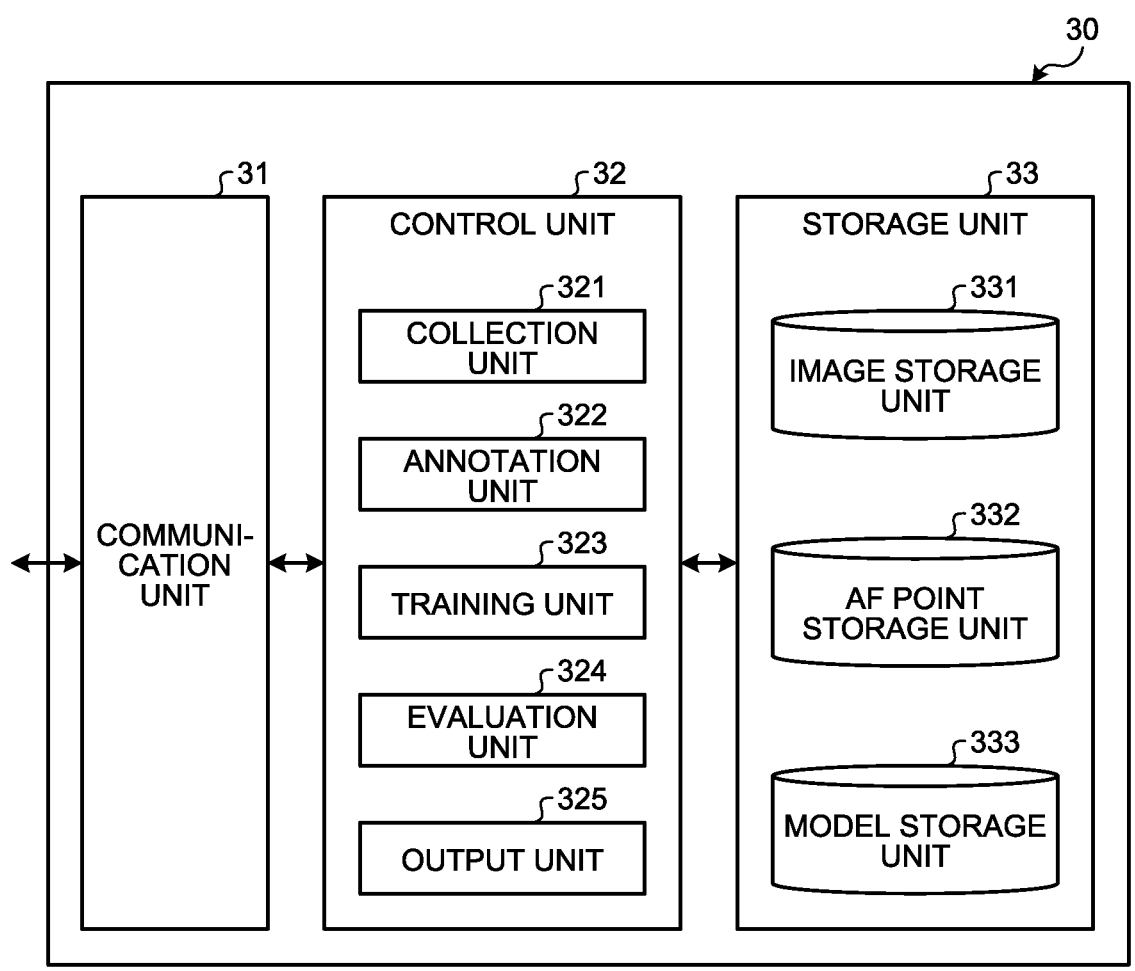
FIG. 3 is a block diagram illustrating one example of a configuration of an information processing apparatus according to the first embodiment of the present disclosure.

1-1-3. Configuration of Information Processing Apparatus According to First Embodiment FIG. 3 is a block diagram illustrating one example of a configuration of an information processing apparatus according to the first embodiment of the present disclosure. As illustrated in FIG. 3, the information processing apparatus 30 is provided with a communication unit 31, a control unit 32, and a storage unit 33.

The communication unit 31 is an interface capable of connecting to the network NW by wired or wireless communication. The communication unit 31 transmits and receives various data with the communication unit 24 of the terminal apparatus 20 over the network NW. Examples of the communication unit 31 are similar to the communication unit 24.

The control unit 32 includes a processor such as a CPU or GPU for example that controls the overall operation of the information processing apparatus 30 by following a program stored in advance in the storage unit 33 and using cache memory or RAM as working memory. Also, the control unit 32 executes a training process for improving autofocus accuracy.

The control unit 32 includes a collection unit 321, an annotation unit 322, a training unit 323, an evaluation unit 324, and an output unit 325. The collection unit 321 collects image data from the terminal apparatus 20 and other information sources over the network NW through the communication unit 31. The annotation unit 322 checks the validity of image data collected by the collection unit 321, and annotates the image data. The training unit 323 performs a training process for improving the autofocus accuracy of the electronic device 1 on the basis of the image data collected by the collection unit 321, and generates the trained model MD as a training result. The training unit 323 may also be realized using a GPU. Because GPUs can perform simple calculations in parallel, GPUs are better-suited to deep learning in particular than CPUs. The evaluation unit 324 evaluates the trained model MD generated by the training unit 323. The output unit 325 outputs the trained model MD in a state available for download over the network NW. The output unit 325 also outputs results computed by each unit, such as aggregation data about image data collected by the collection unit 321 and the image data, for example.

The storage unit 33 is a storage apparatus such as an SSD or an HDD for example, and stores information such as image data collected over the network NW, various programs executed by the control unit 32, and various data generated as a result of processing by the control unit 32. The storage unit 33 may also be made independent from the information processing apparatus 30 as a dedicated file server. The storage unit 33 includes an image storage unit 331, an AF point storage unit 332, and a model storage unit 333. The image storage unit 331 stores image data collected by the collection unit 321. The model storage unit 333 stores the trained model MD generated by the training unit 323.

1-2. Procedure for Installing Trained Model According to First Embodiment

Figure 4:
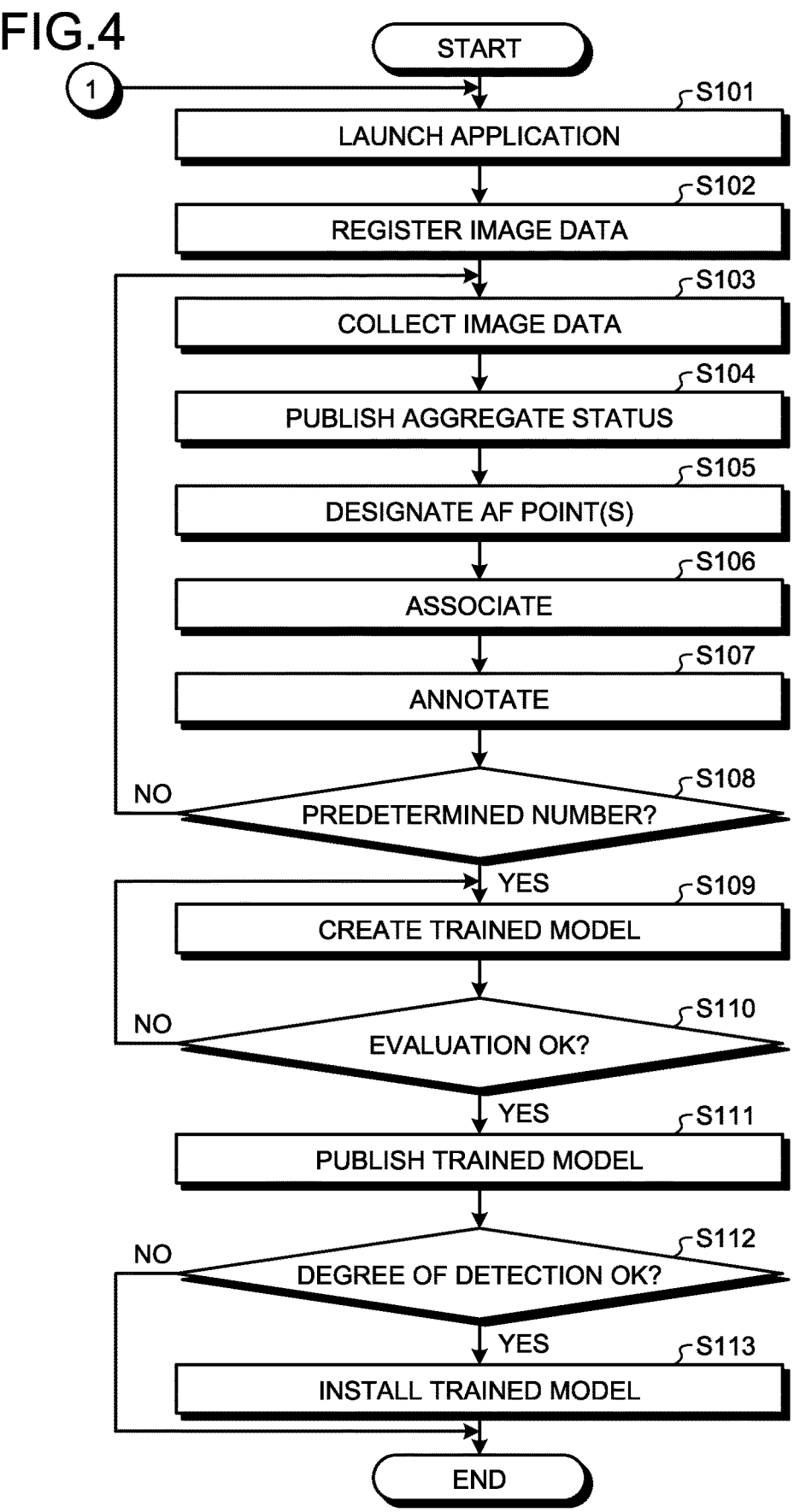
FIG. 4 is a flowchart illustrating one example of a procedure for installing a trained model according to the first embodiment of the present disclosure.

Next, FIG. 4 will be used to describe one example of a procedure for installing a trained model according to the first embodiment of the present disclosure. FIG. 4 is a flowchart illustrating one example of a procedure for installing a trained model according to the first embodiment of the present disclosure. Note that although FIG. 4 illustrates a process executed by the terminal apparatus 20 and a process executed by the information processing apparatus 30 as a single process, the process executed by the information processing apparatus 30 may also be executed separately from the process by the terminal apparatus 20. Specifically, the process from steps S103 to S111 in FIG. 4 may be executed independently.

The user launches the special-purpose application software AS on the terminal apparatus 20 (step S101). At this time, the AS control unit 22 reads out and executes the special-purpose application software AS stored in the AS storage unit 23 according to a signal from the input unit 25, and displays a window of a special-purpose application screen on the display unit 26.

The user uses the input unit 25 to perform operations on the special-purpose application screen displayed on the display unit 26, and registers the image data of an object OBJ that the user wants to be recognized by the autofocus of the electronic device 1 as training image data GD (step S102). The image data of the object OBJ may be image data stored in advance in the AS storage unit 23 or image data acquired through the I/F unit 21 or the communication unit 24. At this time, the AS control unit 22 uploads the training image data GD to the information processing apparatus 30 through the communication unit 24 according to a signal from the input unit 25. Note that the AS control unit 22 may also store the training image data GD in a folder for uploading that has been prepared in the AS storage unit 23. For example, the AS control unit 22 may upload the training image data GD stored in the folder for uploading to the information processing apparatus 30 periodically by a function of the special-purpose application software AS.

Next, the process by the information processing apparatus 30 to which image data has been uploaded will be described. The information processing apparatus 30 collects the training image data GD uploaded from the terminal apparatus 20 in which the special-purpose application software AS is installed (step S103). Note that the information processing apparatus 30 may also cycle through a plurality of terminal apparatus 20 in which the special-purpose application software AS is installed according to a technique such as crawling, and collect the training image data GD stored in the folder for uploading that has been prepared in the AS storage unit 23. At this time, the collection unit 321 receives the training image data GD from the terminal apparatus 20 over the network NW through the communication unit 31, and stores the received training image data GD in the image storage unit 331. Furthermore, the collection unit 321 may also collect image data publicly available on the network NW as training image data GD through the communication unit 31, and store the collected training image data GD in the image storage unit 331. Additionally, the collection unit 321 may also collect image data stored in a storage medium such as an optical disc as the training image data GD.

Figure 7:
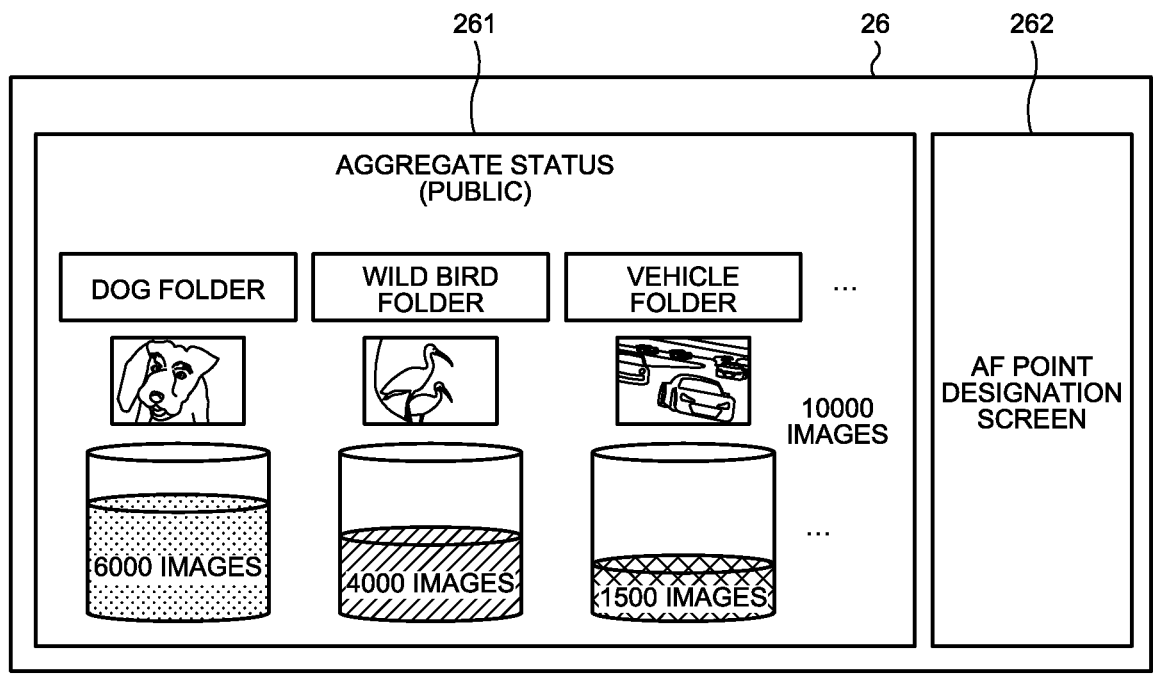
FIG. 7 is a diagram for explaining a web screen that publishes image data and the aggregate status thereof.

The collection unit 321 automatically divides up the training image data GD uploaded from the terminal apparatus 20 by category and class. The output unit 325 creates web-accessible data about the training image data GD and the aggregate status thereof (step S104). The creation of data in step S104 may be performed every time images are collected, but may also be executed in cases where the public information is accessed. As illustrated in FIG. 7, the user is able to check the training image data GD collected by the information processing apparatus 30 and the aggregate status thereof on a public screen 261 on the special-purpose application screen displayed on the display unit 26. At this time, the user is able to check the training image data GD uploaded not only by the user him- or herself, but also other users. Additionally, the user is also able to set the training image data GD uploaded by him- or herself to private. The training image data GD that has been set to private is not made public to other users, but is used in the training process together with the public training image data GD.

Next, the collection unit 321 designates AF points in the collected image data (step S105). The collection unit 321 reads out information about AF points designated in the image data by users. The information processing apparatus 30 may also perform image analysis on the image data to designate the AF points. Additionally, the information processing apparatus 30 may also register information about AF points for images not registered by users, or in other words image data already stored in a database. Hereinafter, one example of the process of designating an AF point in image data will be described. The user uses the input unit 25 to perform an operation on the special-purpose application screen displayed on the display unit 26, and designates a desired position to bring into focus in the training image data GD collected by the information processing apparatus 30 as an AF point P (range-finding point). At this time, the AS control unit 22 displays registered training image data GD on the special-purpose application screen displayed on the display unit 26, and designates the AF point P by moving the AF point P displayed on top of the training image data GD according to a signal from the input unit 25. For example, when desired training image data GD is selected from among the training image data GD publicly available on the public screen 261 as illustrated in FIG. 7, the AS control unit 22 displays the training image data GD and the AF point P on an AF point designation screen 262.

Figure 8:
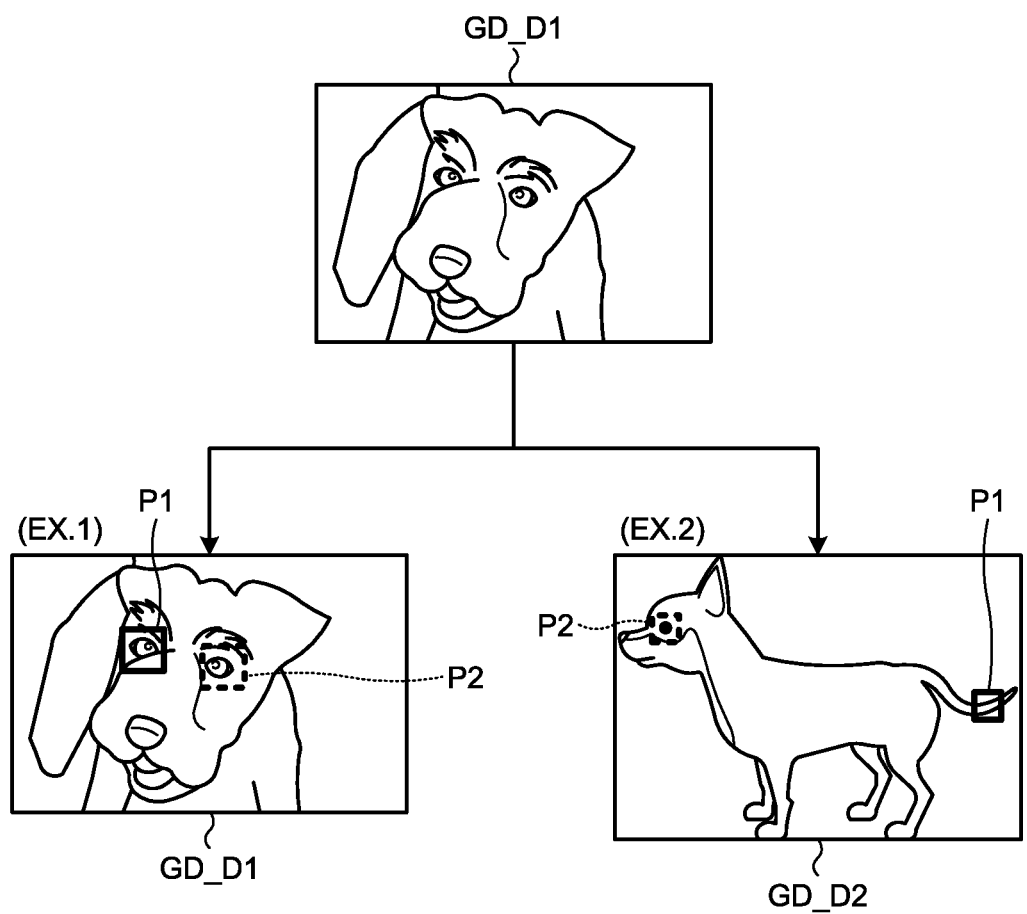
FIG. 8 is a diagram for explaining an instance of designating an AF point (range-finding point) on an image of an animal.
Figure 9:
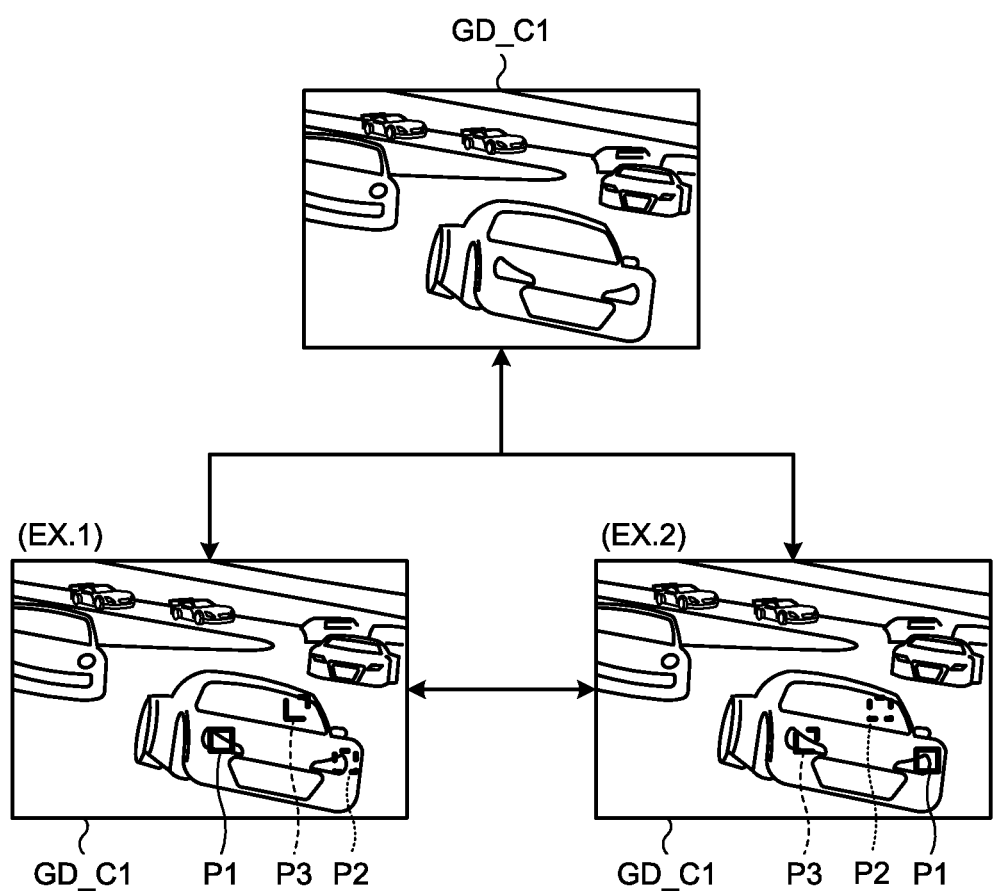
FIG. 9 is a diagram for explaining an instance of designating an AF point on an image of a vehicle.

In the present embodiment, as illustrated in FIGS. 8 and 9, the user is able to designate and decide an order of priority for a plurality of AF points P with respect to a single piece of training image data GD. Any number of AF points P may be designated. In the present embodiment, the user designates a maximum of three AF points P, in the order of a first-priority AF point P1, a second-priority AF point P2, and a third-priority AF point P3. FIG. 8 illustrates an example of training image data GD_D1 of an animal (dog), while FIG. 9 illustrates an example of training image data GD_C1 of a vehicle (racing car). For example, as illustrated in (Ex. 1) of FIG. 8, a plurality of AF points P are displayed in advance on the web with respect to the uploaded training image data GD_D1 of an animal (dog), and the user is able to designate an AF point P by moving a displayed AF point P. The user may also be able to designate how many AF points P to display. Alternatively, as illustrated in (Ex. 2) of FIG. 8, a plurality of AF points P may be displayed in advance on the web with respect to illustration image data GD_D2 of an animal (dog) corresponding to the training image data GD_D1 of an animal (dog). Also, as illustrated in (Ex. 1) and (Ex. 2) of FIG. 9, the positions and the order of priority of these AF points P may be freely changeable by the user.

The control unit 32 associates AF point data PD indicating the AF points P designated with respect to the training image data GD with the training image data GD (step S106). The control unit 32 stores the associated data in the AF point storage unit 332. For example, the AF point data PD includes an identifier, the priority, and parameter-related information such as the focus position and offset of each AF point P. The AF point data PD may be stored together with identification information about the training image data GD in a record that forms a table inside a database.

The annotation unit 322 checks the validity of the training image data GD, the AF point data PD, the classification, and the like, and annotates the image data (step S107). The annotation unit 322 may also receive an annotation-related instruction from an external source through the communication unit 31. Annotation includes information such as information indicating the classification of an image and information associated with the AF point data PD.

The collection unit 321 confirms whether a predetermined number of pieces of training image data GD has been collected for each category and class (step S108). The predetermined number is not particularly limited, but may be 10,000 images as an example. Also, in cases where it is possible to create a trained model with a small amount of image data, the predetermined number may also be several images. In the case where the predetermined number has not been collected (step S108, No), the collection unit 321 continues the collection of the training image data GD (returns to step S103). In other words, the information processing apparatus 30 does not create a trained model until the predetermined number of pieces of image data is collected for the classification in question.

In the case where the predetermined number of images has been collected for each category and class of the training image data GD (step S108, Yes), the collection unit 321 treats the plurality of training image data GD and its AF point data PD as a data set for training, and instructs the training unit 323 to start a training process (proceed to step S109).

The training unit 323 performs a training process on the basis of the plurality of training image data GD and the AF point data PD associated with each piece of the training image data GD, and creates the trained model MD as a result of the training process (step S109). For example, the training unit 323 examines algorithms for detecting the AF points P, and generates detection codes and parameters as the trained model MD. In this way, the training unit 323 performs the training process by using the training image data GD with designated AF points P. Also, the training unit 323 creates the trained model MD for each category and class. At this time, the training unit 323 may create, for each category and glass, a trained model MD for each user, or a trained model MD common to all users. The trained model MD for each user is a trained model MD that prioritizes the detection of the AF points P designated by the user. The trained model MD common to all users is a trained model MD that detects the AF point(s) P that is like a greatest common factor among the AF points P designated by each of the users. For example, the trained model MD common to all users may be a trained model MD that detects the AF point(s) P designated by the most users. The created trained model MD is stored in the model storage unit 333.

The evaluation unit 324 performs a process of evaluating the trained model MD stored in the model storage unit 333 (step S110). For example, the evaluation unit 324 inputs the training image data GD into the trained model MD, and receives a result from the trained model MD as output. In the case where the result of the evaluation process is determined to be unsatisfactory (step S110, No), the evaluation unit 324 instructs the training unit 323 to start the training process again and recreate the trained model MD (return to step S109). On the other hand, in the case where the result of the evaluation process is determined to be satisfactory (step S110, Yes), the evaluation unit 324 instructs the output unit 325 to publish the trained model MD (proceed to step S111).

The output unit 325 publishes the trained model MD on the network NW in a state accessible only from the terminal apparatus 20 with the special-purpose application software AS installed, and outputs to devices requesting the trained model MD (step S111). At this time, the output unit 325 assigns access privileges to the trained model MD that make the trained model MD accessible only from the terminal apparatus 20 with the special-purpose application software AS installed or through the special-purpose application software AS, publishes the trained model MD on the network NW through the communication unit 31, and outputs to devices requesting the trained model MD. For example, the output unit 325 may display the trained model MD in a selectable state only on an application screen displayed by executing the special-purpose application software AS.

Figure 10:
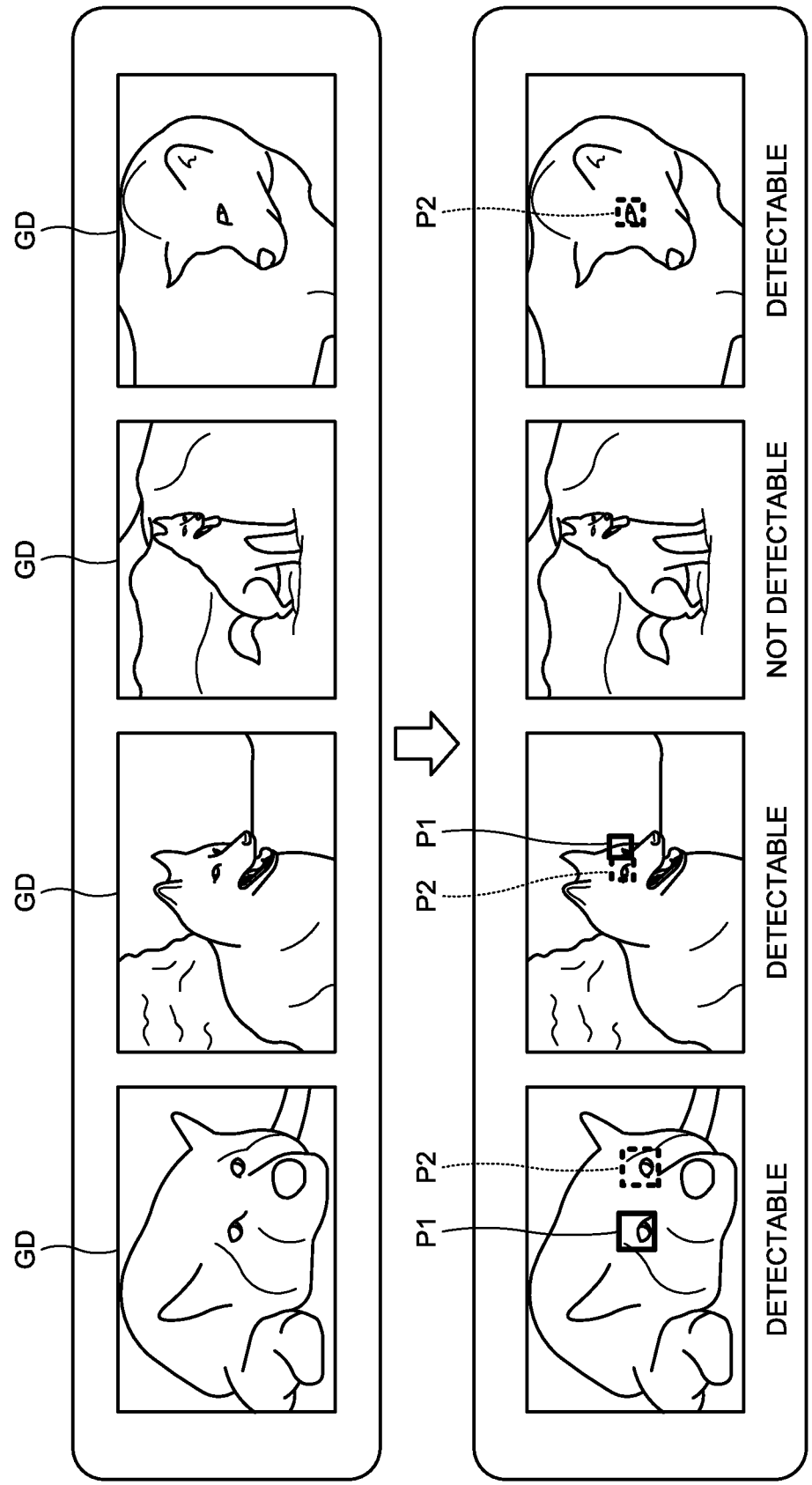
FIG. 10 is a diagram for explaining a confirmation of a degree of autofocus detection based on a trained model.

The user uses the input unit 25 to perform an operation on the special-purpose application screen displayed on the display unit 26, selects and downloads the trained model MD, and checks the degree of autofocus detection (accuracy) of autofocus based on the downloaded trained model MD (step S112). At this time, the AS control unit 22 acquires the trained model MD through the communication unit 24 according to a signal from the input unit 25, and stores the acquired trained model MD in the AS storage unit 23. Subsequently, the AS control unit 22 inputs the training image data GD into the trained model MD stored in the AS storage unit 23 on the special-purpose application screen displayed on the display unit 26 according to a signal from the input unit 25, and displays a result from the trained model MD as illustrated in FIG. 10. Note that the AS control unit 22 may also execute emulation of the autofocus of the electronic device 1 on the basis of the trained model MD stored in the AS storage unit 23 on the special-purpose application screen displayed on the display unit 26.

Note that in actuality, the degree of autofocus detection based on the trained model MD may be confirmed on the information processing apparatus 30 side rather than the terminal apparatus 20 side before downloading the trained model MD. In this case, the control unit 32 inputs the training image data GD into the trained model MD selected by the user over the network NW through the communication unit 31, and outputs a result from the trained model MD to the terminal apparatus 20. The AS control unit 22 displays the result of the trained model MD output from the information processing apparatus 30 on the special-purpose application screen displayed on the display unit 26.

In the case where the result of confirming the degree of autofocus detection based on the trained model MD is determined to be unsatisfactory (step S112, No), the user does not adopt the trained model MD. At this time, the AS control unit 22 may also delete the trained model MD stored in the AS storage unit 23. On the other hand, in the case where the result of confirming the degree of autofocus detection based on the trained model MD is determined to be satisfactory (step S112, Yes), the user adopts the trained model MD (proceeds to step S113).

The user installs the trained model MD in the electronic device 1 (step S113). At this time, the AS control unit 22 writes out the trained model MD stored in the AS storage unit 23 to the electronic device 1 through the I/F unit 21 according to a signal from the input unit 25. The control unit 3 acquires and stores the trained model MD in the storage unit 7 through the I/F unit 9, and sets the trained model MD for use in autofocus. In the case where a trained model MD of the same category or class is already set, the trained model MD is updated. The series of processes ends here.

It is not necessary for the electronic device 1 to update all (all categories/all classes) of the trained models MD held in the information processing apparatus 30 all at once, and it is sufficient for the electronic device 1 to acquire the trained model MD corresponding to a required mode on the basis of a user selection. With this arrangement, the user is able to selectively install, in the electronic device 1, only the trained model MD of objects that the user expects to shoot him- or herself.

1-3. Procedure for Confirming Shot Image According to First Embodiment

Figure 5:
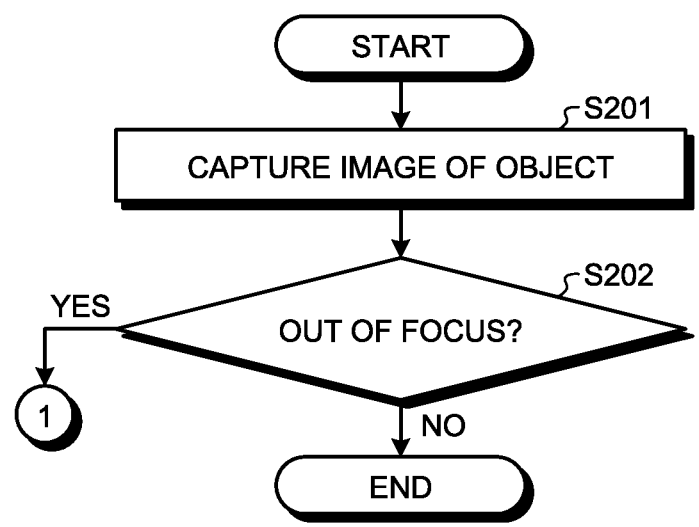
FIG. 5 is a flowchart illustrating one example of a procedure for confirming a shot image according to the first embodiment of the present disclosure.

Next, FIG. 5 will be used to describe one example of a procedure for confirming a shot image according to the first embodiment of the present disclosure. FIG. 5 is a flowchart illustrating one example of a procedure for confirming a shot image according to the first embodiment of the present disclosure.

The user shoots the object OBJ using the electronic device 1 with the trained model MD installed (step S201). The electronic device 1 performs autofocus on the basis of the newly written trained model MD, and brings a predetermined position on the object OBJ into focus. At this time, the control unit 3 outputs a control signal for controlling the autofocus mechanism of the optical system 2 on the basis of the trained model MD stored in the storage unit 7 according to a signal from the input device 10. After that, the electronic device 1 images the object OBJ and generates image data (which may also be RAW data).

The user checks for the presence or absence of image data (out-of-focus image data) in which an intended spot (part) is not in focus among the image data of the object OBJ shot with the electronic device 1 (step S202). In the case where out-of-focus image data does not exist (step S202, No), the process ends.

In the case where out-of-focus image data exists (step S202, Yes), the user registers the out-of-focus image data as new training image data GD (proceeds to step S101 of FIG. 4). In other words, the user uses the input unit 25 to launch the special-purpose application software AS on the terminal apparatus 20 (corresponding to step S101 of FIG. 4), performs an operation on the special-purpose application screen displayed on the display unit 26, and registers the new training image data GD (corresponding to step S102 of FIG. 4). At this time, the AS control unit 22 reads out and executes the special-purpose application software AS stored in the AS storage unit 23 according to a signal from the input unit 25, displays the window of the special-purpose application screen on the display unit 26, acquires the training image data GD through the I/F unit 21 or the communication unit 24, and stored the acquired training image data GD in the AS storage unit 23. After that, the flow proceeds to the process in step S103 of FIG. 4.

By repeating the procedure for installing a trained model illustrated in FIG. 4 and the procedure for confirming a shot image illustrated in FIG. 5, the accuracy of the trained model MD is cumulatively improved, and therefore the accuracy of the autofocus may be improved.

1-4. Modification (1) of First Embodiment

1-4-1. AF Point Designation Before Uploading Image Data

In the above description, in step S105 of FIG. 4, the AF points P are designated with respect to the training image data GD on the information processing apparatus 30, but in addition, in step S102 of FIG. 4, the AF points P may also be designated with respect to the training image data GD on the terminal apparatus 20 before uploading the training image data GD.

Figure 11:
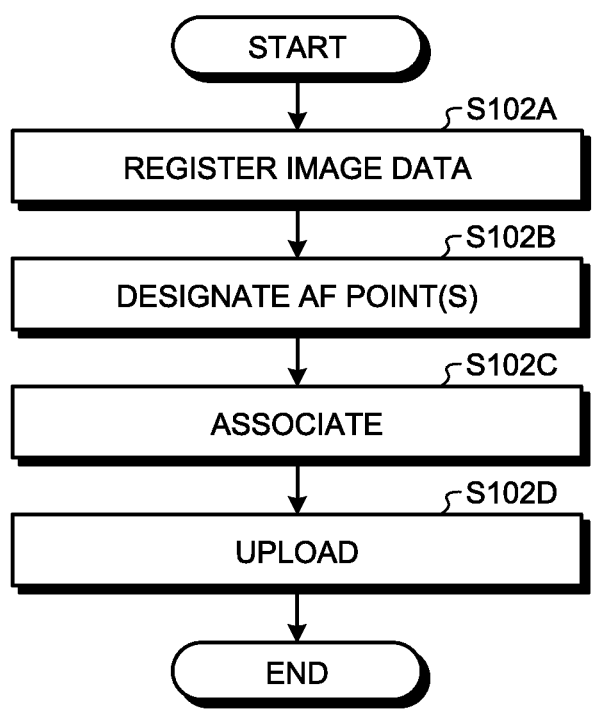
FIG. 11 is a flowchart illustrating one example of a procedure for designating an AF point before uploading image data.

FIG. 11 will be used to describe one example of the process in step S102 of FIG. 4 according to Modification (1) of the first embodiment. FIG. 11 is a flowchart illustrating one example of the process in step S102 of FIG. 4.

The user uses the input unit 25 to perform operations on the special-purpose application screen displayed on the display unit 26, and registers the image data of an object OBJ that the user wants to be recognized by the autofocus of the electronic device 1 as training image data GD (step S102A). The image data of the object OBJ may be image data stored in advance in the AS storage unit 23 or image data acquired through the I/F unit 21 or the communication unit 24.

The user uses the input unit 25 to perform an operation on the special-purpose application screen displayed on the display unit 26, and designates a desired position to bring into focus in the registered training image data GD as an AF point P (step S102B). At this time, the AS control unit 22 displays registered training image data GD on the special-purpose application screen displayed on the display unit 26, and designates the AF point P by moving the AF point P displayed on top of the training image data GD according to a signal from the input unit 25. The display and the designation of the AF point(s) P is as illustrated in FIGS. 8 and 9.

The AS control unit 22 associates AF point data PD indicating the AF points P designated with respect to the training image data GD with the training image data GD, and stores the associated data in the AS storage unit 23 (step S102C). The AF point data PD is as described earlier. Note that the AF point data PD may also incorporate the training image data GD as metadata.

The AS control unit 22 uploads the training image data GD together with the associated AF point data PD to the information processing apparatus 30 through the communication unit 24 according to a signal from the input unit 25 (step S102D).

In this case, in step S103 of FIG. 4, the information processing apparatus 30 collects the training image data GD and the AF point data PD uploaded from the terminal apparatus 20 with the special-purpose application software AS installed. At this time, the collection unit 321 stores the training image data GD received from the terminal apparatus 20 over the network NW through the communication unit 31 in the image storage unit 331, and stores the associated AF point data PD in the AF point storage unit 332.

With this arrangement, AF points may be designated in two stages, namely before and after uploading the training image data GD. Before uploading, the user is able to designate AF points P with respect to the training image data GD he or she owns, whereas after uploading, the user is able to correct the AF points P of the training image data GD he or she has uploaded, or designate AF points P with respect to training image data GD uploaded by other users.

Also, it is anticipated that visually examining all of the training image data GD published together with the aggregate status on the information processing apparatus 30 and designating AF points P would be extremely tiring for a single user. For this reason, the load on the user side may be reduced by having the user designate AF points P with respect to the training image data GD he or she owns before uploading. With this arrangement, each published piece of training image data GD at least has an AF point P designated by the uploading user. By having each user give approval if the user is not dissatisfied with the AF point P designated by the user who uploaded the training image data GD, the AF point(s) P designated by the user him- or herself may be set.

1-5. Modification (2) of First Embodiment

1-5-1. Semi-Automated Training

Figure 12:
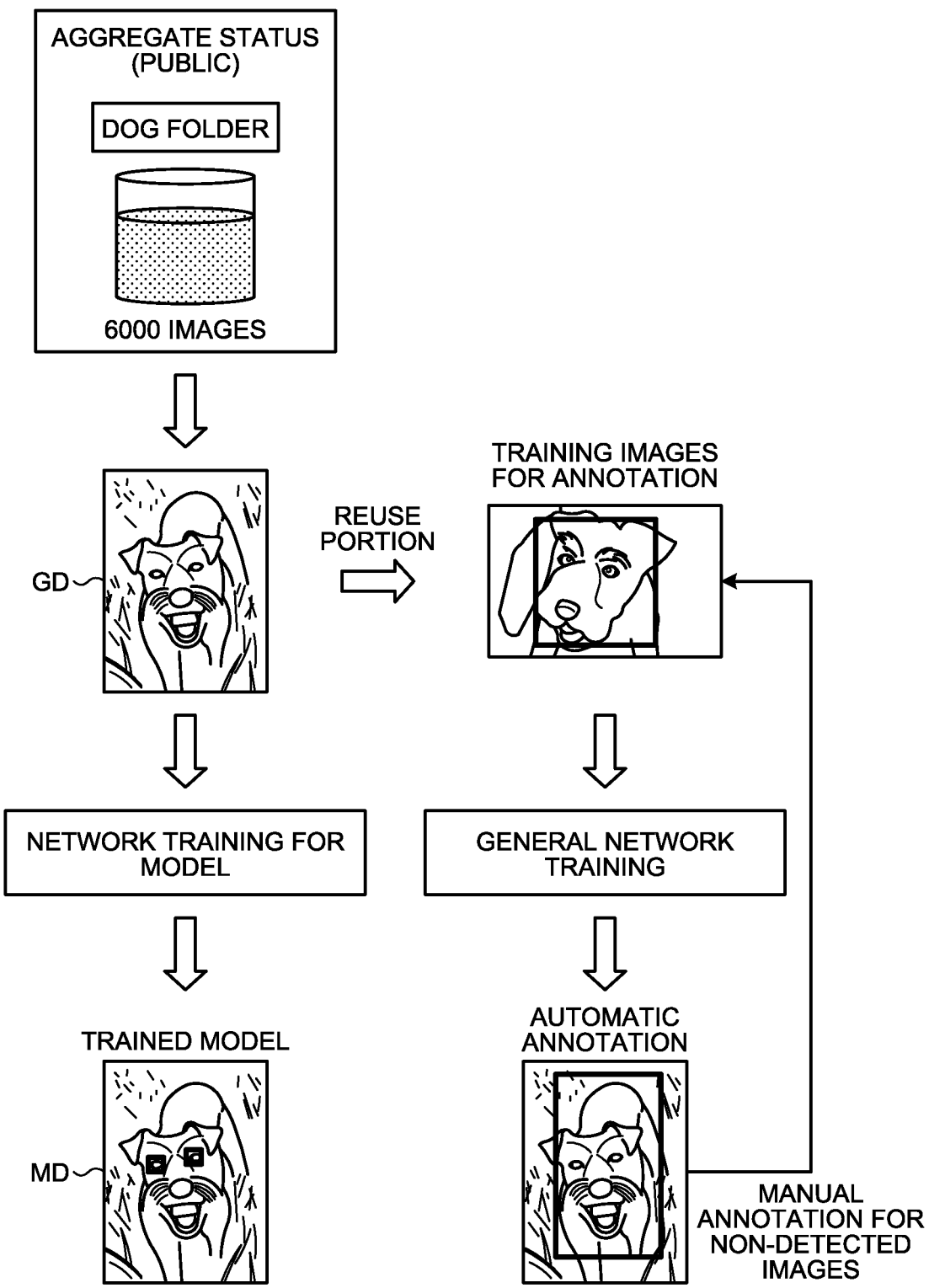
FIG. 12 is a diagram for explaining an instance of reusing a portion of image data used in network training for a model in general network training for annotation.

The information processing apparatus 30 may also perform the annotation by the annotation unit 322 and the training process by the training unit 323 in parallel. For example, as illustrated in FIG. 12, to create the trained model MD, the training image data GD collected from users is used in network training for creating the trained model for the users. However, by reusing some (or all) of the training image data GD in general network training for automated annotation, the automation of annotation may be attained. Network training refers to machine learning utilizing neural networks, and also encompasses deep learning utilizing deep neural networks. General network training may be performed by utilizing a plurality of methods in parallel. Note that in the case of non-detection by automatic annotation, manual annotation is performed. With this arrangement, semi-automated training becomes possible.

2. Second Embodiment

2-1. Configuration of System According to Second Embodiment

Figure 13:
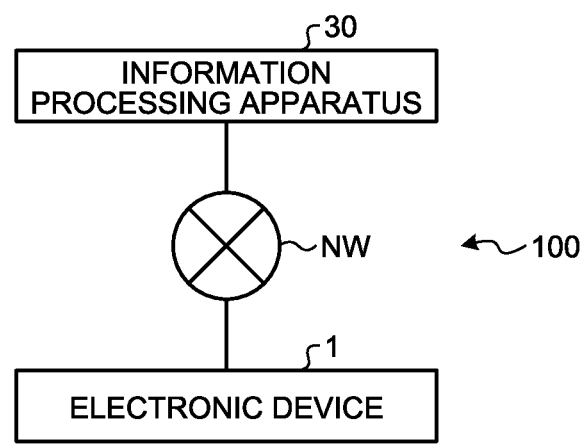
FIG. 13 is a block diagram illustrating one example of a configuration of an information processing system according to the second embodiment of the present disclosure.

FIG. 13 is a block diagram illustrating one example of a configuration of an information processing system according to the second embodiment of the present disclosure. As illustrated in FIG. 13, an information processing system 100 includes an electronic device 1, and an information processing apparatus 30. The electronic device 1 exists on a user side, while the information processing apparatus 30 exists on a network side.

In the second embodiment of the present disclosure, a configuration corresponding to the terminal apparatus 20 in the first embodiment of the present disclosure is provided inside the electronic device 1, such as in the form of an application processor for example. In other words, the electronic device 1 also includes the functions of the terminal apparatus 20. In the present embodiment, the electronic device 1 is anticipated to be a high-end device model, such as a smartphone or tablet with imaging functions, or alternatively a digital camera or a digital video camera with communication functions. The information processing apparatus 30 is similar to the first embodiment. In other words, the electronic device 1 according to the second embodiment of the present disclosure and the terminal apparatus 20 according to the first embodiment of the present disclosure are capable of connecting to the same information processing apparatus 30 over the network NW. Consequently, it is possible to carry out the first embodiment and the second embodiment of the present disclosure at the same time.

2-1-1. Configuration of Electronic Device According to Second Embodiment

Figure 14:
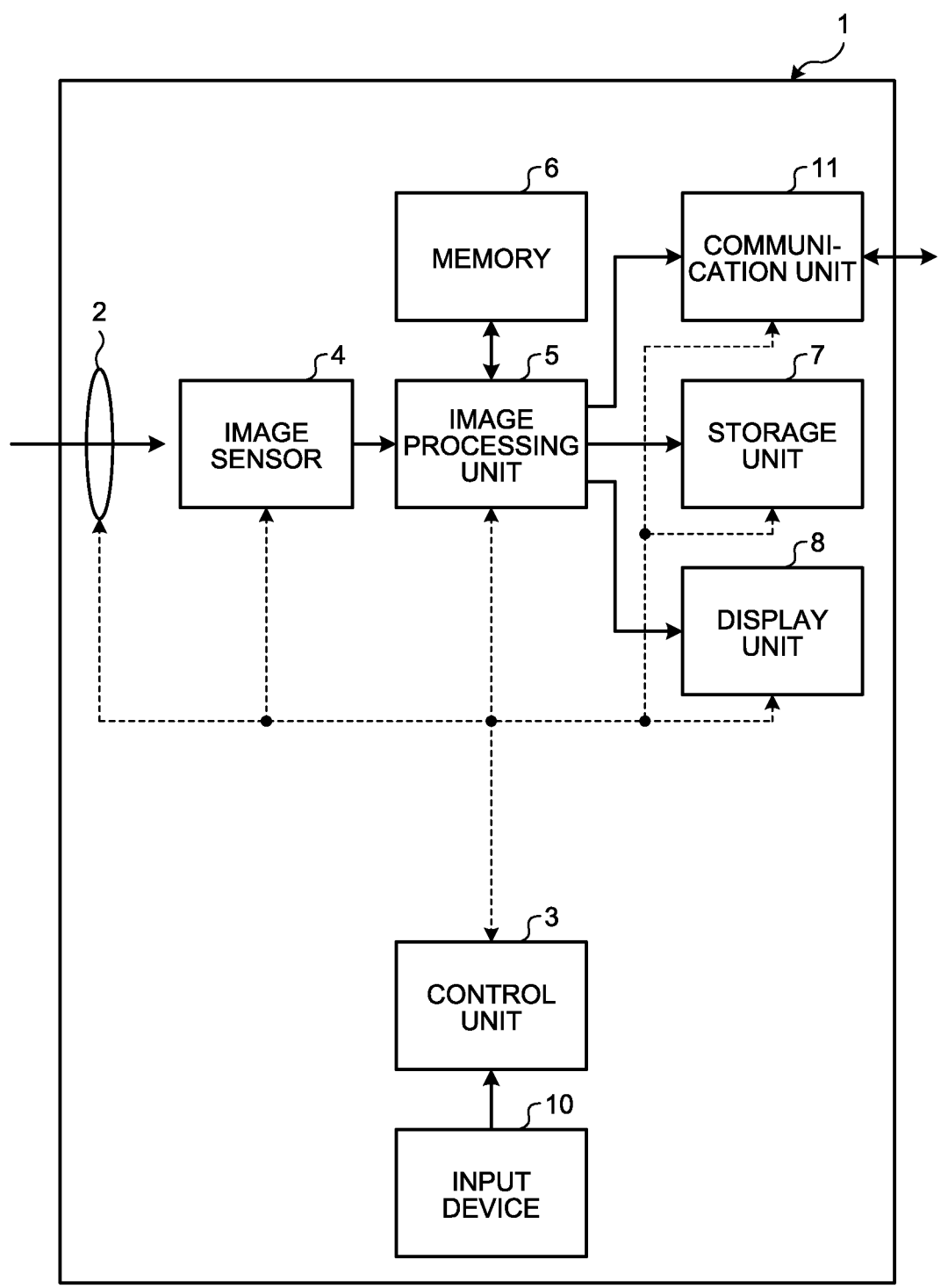
FIG. 14 is a block diagram illustrating one example of a configuration of an electronic device according to the second embodiment of the present disclosure.

FIG. 14 is a block diagram illustrating one example of a configuration of an electronic device according to the second embodiment of the present disclosure. As illustrated in FIG. 14, the electronic device 1 is provided with an optical system 2, a control unit 3, an image sensor 4, an image processing unit 5, memory 6, a storage unit 7, a display unit 8, a communication unit 11, and an input device 10.

The operations of the optical system 2, the control unit 3, the image sensor 4, the image processing unit 5, the memory 6, the storage unit 7, the display unit 8, and the input device 10 are basically similar to the first embodiment. Furthermore, in the present embodiment, the control unit 3 corresponds to the AS control unit 22 in the first embodiment, and the storage unit 7 corresponds to the AS storage unit 23 in the first embodiment. In other words, the control unit 3 executes the special-purpose application software AS, and the storage unit 7 stores the special-purpose application software AS. Also, the display unit 8 corresponds to the display unit 26 in the first embodiment, and the input device 10 corresponds to the input unit 25 in the first embodiment. The communication unit 11 corresponds to the communication unit 24 in the first embodiment. In other words, the communication unit 11 is an interface capable of connecting to the network NW by wired or wireless communication.

2-2. Procedure for Installing Trained Model According to Second Embodiment

Next, in a similar manner as the first embodiment, FIG. 4 will be used to describe one example of a procedure for installing a trained model according to the second embodiment. In the present embodiment, because the functions of the terminal apparatus 20 are built into the electronic device 1, the electronic device 1 itself also fulfills the role of the terminal apparatus 20 and therefore the agent performing the operations changes, but otherwise the basic processing procedure is the same.

In step S101 of FIG. 4, the user launches the special-purpose application software AS on the electronic device 1. At this time, the control unit 3 reads out and executes the special-purpose application software AS stored in the storage unit 7 according to a signal from the input device 10, and displays a window of a special-purpose application screen on the display unit 8.

In step S102 of FIG. 4, the user uses the input device 10 to perform operations on the special-purpose application screen displayed on the display unit 8, and registers the image data of an object OBJ that the user wants to be recognized by the autofocus of the electronic device 1 as training image data GD. At this time, the control unit 3 uploads the training image data GD to the information processing apparatus 30 through the communication unit 11 according to a signal from the input device 10.

In step S103 of FIG. 4, the information processing apparatus 30 collects the training image data GD uploaded from the electronic device 1 with the special-purpose application software AS installed. At this time, the collection unit 321 receives the training image data GD from the electronic device 1 over the network NW through the communication unit 31, and stores the received training image data GD in the image storage unit 331.

In step S104 of FIG. 4, the collection unit 321 automatically divides up the training image data GD uploaded from the electronic device 1 by category and class, and publishes the training image data GD and the aggregate status thereof on the web (step S104).

In step S105 of FIG. 4, the user uses the input device 10 to perform an operation on the special-purpose application screen displayed on the display unit 8, and designates a desired position to bring into focus in the training image data GD collected by the information processing apparatus 30 as an AF point P. At this time, the control unit 3 displays registered training image data GD on the special-purpose application screen displayed on the display unit 8, and designates the AF point P by moving the AF point P displayed on top of the training image data GD according to a signal from the input device 10.

In step S106 of FIG. 4, the control unit 32 associates AF point data PD indicating the AF points P designated with respect to the training image data GD with the training image data GD, and stores the associated data in the AF point storage unit 332.

In step S107 of FIG. 4, the annotation unit 322 checks the validity of the training image data GD and the AF point data PD, and annotates the image data.

In step S108 of FIG. 4, the collection unit 321 confirms whether a predetermined number of pieces of the training image data GD (for example, 10,000 images) have been collected for each category and class. In the case where the predetermined number has not been collected (step S110, No), the collection unit 321 continues the collection of the training image data GD (returns to step S103). On the other hand, in the case where the predetermined number of images has been collected for each category and class of the training image data GD (step S110, Yes), the collection unit 321 treats the plurality of training image data GD and its AF point data PD as a data set for training, and instructs the training unit 323 to start a training process (proceed to step S109).

In step S109 of FIG. 4, the training unit 323 performs a training process on the basis of the plurality of training image data GD and the AF point data PD associated with each piece of the training image data GD, and creates the trained model MD as a result of the training process.

In step S110 of FIG. 4, the evaluation unit 324 performs a process of evaluating the trained model MD stored in the model storage unit 333. In the case where the result of the evaluation process is determined to be unsatisfactory (step S110, No), the evaluation unit 324 instructs the training unit 323 to start the training process again and recreate the trained model MD (return to step S109). On the other hand, in the case where the result of the evaluation process is determined to be satisfactory (step S110, Yes), the evaluation unit 324 instructs the output unit 325 to publish the trained model MD (proceed to step S111).

In step S111 of FIG. 4, the output unit 325 publishes the trained model MD on the network NW in a state accessible only from the electronic device 1 with the special-purpose application software AS installed, and outputs to devices requesting the trained model MD.

In step S112 of FIG. 4, the user uses the input device 10 to perform an operation on the special-purpose application screen displayed on the display unit 8, selects and downloads the trained model MD, and checks the degree of autofocus detection of autofocus based on the downloaded trained model MD. At this time, the control unit 3 obtains the trained model MD through the communication unit 11 according to a signal from the input device 10 to store the trained model MD in the storage unit 7, input the training image data GD into the trained model MD stored in the storage unit 7 on the special-purpose application screen displayed on the display unit 8, and displays a result from the trained model MD.

In the case where the result of confirming the degree of autofocus detection based on the trained model MD is determined to be unsatisfactory (step S112, No), the user does not adopt the trained model MD. At this time, the control unit 3 may also delete the trained model MD stored in the storage unit 7. On the other hand, in the case where the result of confirming the degree of autofocus detection based on the trained model MD is determined to be satisfactory (step S112, Yes), the user adopts the trained model MD (proceeds to step S113).

In step S113 of FIG. 4, the user installs the trained model MD in the electronic device 1. At this time, the control unit 3 sets the trained model MD stored in the storage unit 7 for use in autofocus according to a signal from the input device 10. The series of processes ends here.

Likewise, in the present embodiment, installing all (all categories/all classes) of the trained model MD held in the information processing apparatus 30 to the electronic device 1 all at once is unrealistic considering the storage capacity of the electronic device 1. However, in the present embodiment, because the electronic device 1 is capable of downloading the trained model MD directly from the information processing apparatus 30, even when the user encounters an object not anticipated in advance, the user is able to download the trained model MD for the object from the information processing apparatus 30 and install the downloaded trained model MD in the electronic device 1 on the spot (in real time). Also, even in the case where the category and class of the object is unclear, by shooting the object and uploading the image data to the information processing apparatus 30 as the training image data GD, the category and class of the object may be ascertained on the screen where the aggregate status is published.

3. Conclusion

As described above, according to each embodiment of the present disclosure, it is possible to improve the autofocus function and detect specific objects according to the demands of users. Additionally, a user-intended spot (part) on the object may be brought into focus automatically. As a result, the user becomes able to shoot while concentrating on the composition and the right moment.

In the case where the object is a living thing such as a person or an animal, the electronic device 1 recognizes the targeted object using the autofocus function, and focuses on the eyes of the living thing. However, in cases where the object is an animal such as a bird, a fish, or an insect in particular, there is an enormous variety of objects with countless variations of body shapes, patterns, markings, and the like. For this reason, it is difficult for a single electronic device 1 to learn all of these varieties and maintain performance for focusing on the eyes for all varieties.

Figure 6:
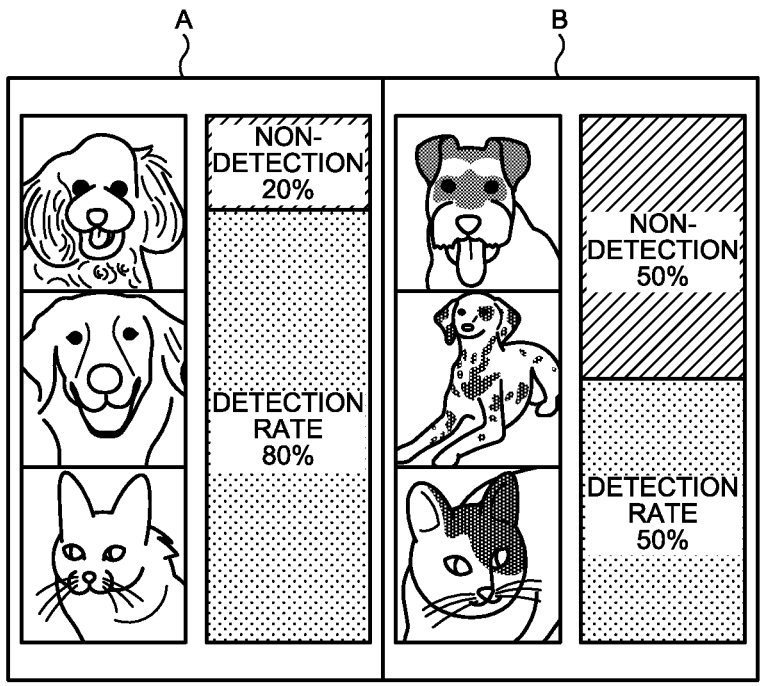
FIG. 6 is a diagram for explaining the relationship between degrees of coloration and markings of animals, and an AF detection ratio.

Also, as illustrated in FIG. 6, in the case of a pet such as a dog or a cat, the detection rate falls depending on the degree of body coloration (such as jet black) and markings. For example, for a group A of plain, clear objects, the detection rate of the eyes of the objects is approximately 80%. However, for a group B of jet-black objects, distinguishing between eyes and patterns is difficult, and the detection rate of the eyes of the objects drops to approximately 50%. Also, in the case of cats with complex patterns, there is a possibility that the ratio of non-detection will increase even further. Consequently, in the case of non-detection for a pet in autofocus, an appropriate training process cannot be performed with individual users.

Also, in the case where the object is a plant or an artificial object such as a vehicle or a building, the targeted object is recognized and a preset spot (part) is brought into focus. For example, in the case where the object is a car, the headlights or the like are brought into focus. However, in this case, similarly to the above case of animals and the like, because there is are abundant variations of shapes, colors, and the like, it is difficult for a single electronic device 1 to learn all of these varieties, set a spot to bring into focus, and maintain performance for focusing on the set spot for all varieties.

Also, although the performance of the electronic device 1 is improving from year to year, the electronic device 1 that is typically used is not yet up to the same performance level as the information processing apparatus 30 in terms of processing power and the like. Furthermore, because the storage capacity of the electronic device 1 is small compared to the information processing apparatus 30, there is a limit to how much image data a single electronic device 1 is capable of holding at one time. For these reasons, even if a training process for improving the autofocus accuracy is performed on the basis of the image data held in a single electronic device 1, a training result that is sufficient enough to satisfy the user cannot be obtained.

The present embodiment performs the training process for improving the autofocus accuracy on the information processing apparatus 30, which is of higher performance than the electronic device 1 and which is capable of holding and processing a larger quantity of image data than the electronic device 1. Additionally, by providing the training result, that is, the trained model MD, to the electronic device 1 as feedback, a highly accurate trained model MD that could not be obtained with the electronic device 1 alone may be installed in the electronic device 1, making it possible to improve the autofocus accuracy.

For example, the information processing apparatus 30 collects a large quantity of image data, and at the point where the number of collected pieces of image data reaches a predetermined number, the information processing apparatus 30 performs the training process for improving the accuracy of the autofocus of the electronic device 1 on the basis of the image data, and provides the trained model MD generated as a training result to the terminal apparatus 20 over the network NW. The user of the electronic device 1 uses the terminal apparatus 20 to check the operation of the autofocus based on the trained model MD on the terminal apparatus 20 or the information processing apparatus 30, and in the case of determining as a result of the operation check that the autofocus accuracy has improved, the user installs the trained model MD in the electronic device 1 through the terminal apparatus 20. The electronic device 1 performs autofocus on the basis of the installed trained model MD.

The information processing apparatus 30 is capable of collecting image data from an unspecified large number of terminal apparatus 20 over the network NW through the special-purpose application software provided to the terminal apparatus 20. Note that the image data used in the training process by the information processing apparatus 30 is not limited to image data collected from the terminal apparatus 20. For example, the information processing apparatus 30 may also perform the training process for improving the autofocus accuracy on the basis of data such as freely usable image data publicly available on the network NW or commercially available image data.

For the training process carried out by the information processing apparatus 30, machine learning such as deep learning utilizing a deep neural network (DNN) may be applied. Additionally, other training methods, algorithms, and the like may also be applied.

According to each of the foregoing embodiments, the detection accuracy is improved for objects that have not been adequately detected by already-provided detectors, making it possible to detect such objects adequately (detection improvement). Also, according to each of the foregoing embodiments, it is possible to provide a detection function with respect to non-detected objects for which a detector has not been provided, making it possible to detect such objects (new object detection). For example, in wildlife shooting, the eyes of creatures such as wild animals, wild birds, and other types of wildlife may be brought into focus. The animal to newly treat as the object is selected from a menu or the like and used.

Also, according to each of the foregoing embodiments, specific objects are discriminated from among successfully detected objects (object discrimination). For example, in cases such as shooting an event like a school athletic meet, it becomes possible to prioritize one's own child and bring the child's eyes into focus. In the case where a familiar person, pet, or the like is the object, the object is registered when shooting from day to day, and is regularly set to the highest priority.

Also, according to each of the above embodiments, with respect to a detected object (particularly an object other than a living thing), it becomes possible to designate an AF point (AF point designation). For example, in motorsport shooting or when shooting trains or airplanes, an intended spot on the object targeted by the user may be brought into focus. The vehicle to treat as the object and the AF point are selected from a menu or the like and used.

Also, according to each of the foregoing embodiments, because continual improvement is possible through the increasing accumulation of image data used for training, the autofocus function may be cumulatively improved (cumulative improvement). Furthermore, according to each of the foregoing embodiments, by having the user regularly shoot and update image data for familiar persons, pets, and the like, the accommodation of the change over time (growth) of an object is also possible (change-over-time accommodation).

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus comprising:

a collection unit that collects image data;

a training unit that uses a plurality of the image data collected by the collection unit to extract an object position included in the image data, perform a training process regarding a relationship between the image data and the object position, and create a trained model for automatic focal point adjustment that specifies an object from the image data to specify a focal position; and an output unit that outputs the trained model created by the training unit to a device requesting the trained model.

(2)

The information processing apparatus according to (1), wherein the collection unit accumulates the collected image data by automatically dividing up the image data by category of the object, and the training unit starts the training process with respect to the object when the image data collected by the collection unit for each category of the object reaches a predetermined number.

(3)

The information processing apparatus according to (2), wherein the output unit outputs the collected image data and an aggregate status of the collected image data by category of the object.

(4)

The information processing apparatus according to (1), wherein a range-finding point is designated in the image data used in the training process.

(5)

The information processing apparatus according to (4), wherein a plurality of range-finding points are designatable, and an order of priority is determined.

(6)

The information processing apparatus according to (5), wherein the order of priority of the plurality of designated range-finding points is changeable.

(7)

The information processing apparatus according to (4), wherein the collection unit collects the image data in which the range-finding point is designated.

(8)

The information processing apparatus according to (1), further comprising: an annotation unit that automatically annotates the image data by utilizing the image data used in the training process by the training unit.

(9)

An electronic device comprising:

a storage unit that stores a trained model for automatic focal point adjustment;

a control unit that performs automatic focal point adjustment on a basis of the trained model stored in the storage unit; and an optical system that brings into focus a predetermined part of an object according to control by the control unit.

(10)
A terminal apparatus comprising:
a communication unit capable of communicating with an information processing apparatus;
a control unit that acquires a trained model for automatic focal point adjustment from the information processing apparatus through the communication unit; and
a provision unit that provides the trained model acquired from the information processing apparatus to an electronic device that performs automatic focal point adjustment on a basis of the trained model.

(11)
The terminal apparatus according to (10), wherein the control unit registers image data in the information processing apparatus through the communication unit, and acquires the trained model based on the image data from the information processing apparatus.

(12)
The terminal apparatus according to (11), further comprising:
a display unit that displays the image data; and
an input unit that outputs a signal corresponding to an input operation by a user to the control unit, wherein
the control unit designates a range-finding point with respect to the image data displayed on the display unit, according to a signal from the input unit.

(13)
The terminal apparatus according to (12), wherein
the display unit displays the image data published by the information processing apparatus, and
the control unit designates the range-finding point with respect to the image data published by the information processing apparatus, according to a signal from the input unit.

(14)
The terminal apparatus according to (12), wherein
the display unit displays the image data before the image data is registered in the information processing apparatus, and
the control unit designates the range-finding point with respect to the image data before the image data is registered in the information processing apparatus, according to a signal from the input unit, and registers the image data in which the range-finding point is designated in the information processing apparatus through the communication unit.

(15)
An information processing system comprising:
an information processing apparatus that collects image data, uses a plurality of the collected image data to extract an object position included in the image data, performs a training process regarding a relationship between the image data and the object position, creates a trained model for automatic focal point adjustment that specifies an object from the image data to specify a focal position, and outputs the trained model to a device requesting the trained model;
a terminal apparatus that acquires the trained model from the information processing apparatus; and
an electronic device that acquires the trained model from the terminal apparatus and performs automatic focal point adjustment on a basis of the trained model.

(16)
An information processing system comprising:
an information processing apparatus that collects image data, uses a plurality of the collected image data to extract an object position included in the image data, performs a training process regarding a relationship between the image data and the object position, creates a trained model for automatic focal point adjustment that specifies an object from the image data to specify a focal position, and outputs the trained model to a device requesting the trained model; and
an electronic device that acquires the trained model from the information processing apparatus and performs automatic focal point adjustment on a basis of the trained model.

(17)
An information processing method comprising:
collecting image data;
using a plurality of the collected image data to extract an object position included in the image data, perform a training process regarding a relationship between the image data and the object position, and create a trained model for automatic focal point adjustment that specifies an object from the image data to specify a focal position; and
outputting the created trained model to a device requesting the trained model.

(18)
A program causing a computer to execute a process comprising:
collecting image data;
using a plurality of the collected image data to extract an object position included in the image data, perform a training process regarding a relationship between the image data and the object position, and create a trained model for automatic focal point adjustment of an electronic device that specifies an object from the image data to specify a focal position; and
outputting the created trained model to a device requesting the trained model.

REFERENCE SIGNS LIST

1 Electronic device
2 Optical system
3 Control unit
7 Storage unit
9 I/F unit
20 Terminal apparatus
21 I/F unit
22 AS control unit
23 AS storage unit
24 Communication unit
25 Input unit
26 Display unit
30 Information processing apparatus
31 Communication unit
32 Control unit
321 Collection unit
322 Annotation unit
323 Training unit
324 Evaluation unit
325 Output unit
33 Storage unit
331 Image storage unit
332 AF point storage unit
333 Model storage unit
100 Information processing system

The invention claimed is:
1. An information processing apparatus, comprising:
a collection unit that collects image data;
a training unit that:

uses a plurality of the image data collected by the collection unit to extract an object position included in the image data, performs a training process regarding a relationship between the image data and the object position, wherein a range-finding point is designated in the image data used in the training process, and creates a trained model for an automatic focal point adjustment that specifies an object from the image data to specify a focal position; and an output unit that outputs the trained model created by the training unit to a device requesting the trained model.

2. The information processing apparatus according to claim 1, wherein the collection unit accumulates the collected image data by automatically dividing up the image data by a category of the object, and the training unit starts the training process with respect to the object when the image data collected by the collection unit for each category of the object reaches a specific number.

3. The information processing apparatus according to claim 2, wherein the output unit outputs the collected image data and an aggregate status of the collected image data by the category of the object.

4. The information processing apparatus according to claim 1, wherein a plurality of range-finding points are designatable, and an order of priority is determined.

5. The information processing apparatus according to claim 4, wherein the order of priority of the plurality of designated range-finding points is changeable.

6. The information processing apparatus according to claim 1, wherein the collection unit collects the image data in which the range-finding point is designated.

7. The information processing apparatus according to claim 1, further comprising an annotation unit that automatically annotates the image data by utilizing the image data used in the training process by the training unit.

8. An electronic device, comprising:
a storage unit that stores a trained model for an automatic focal point adjustment, wherein the trained model is based on a range-finding point designated in image data;
a control unit that performs the automatic focal point adjustment based on the trained model stored in the storage unit; and
an optical system that brings into focus a specific part of an object according to control by the control unit.

9. A terminal apparatus, comprising:
a communication unit capable of communicating with an information processing apparatus;
a control unit that acquires a trained model for an automatic focal point adjustment from the information processing apparatus through the communication unit, wherein the trained model is based on a range-finding point designated in image data; and
a provision unit that provides the trained model acquired from the information processing apparatus to an electronic device that performs the automatic focal point adjustment based on the trained model.

10. The terminal apparatus according to claim 9, wherein the control unit:
registers the image data in the information processing apparatus through the communication unit; and
acquires the trained model based on the image data from the information processing apparatus.

11. The terminal apparatus according to claim 10, further comprising:
a display unit that displays the image data; and
an input unit that outputs a signal corresponding to an input operation by a user to the control unit, wherein
the control unit designates the range-finding point with respect to the image data displayed on the display unit, according to the signal from the input unit.

12. The terminal apparatus according to claim 11, wherein
the display unit displays the image data published by the information processing apparatus, and
the control unit designates the range-finding point with respect to the image data published by the information processing apparatus, according to the signal from the input unit.

13. The terminal apparatus according to claim 11, wherein
the display unit displays the image data before the image data is registered in the information processing apparatus, and
the control unit:
designates the range-finding point with respect to the image data before the image data is registered in the information processing apparatus, according to the signal from the input unit, and
registers the image data in which the range-finding point is designated in the information processing apparatus through the communication unit.

14. An information processing system, comprising:
an information processing apparatus that:
collects image data,
uses a plurality of the collected image data to extract an object position included in the image data,
performs a training process regarding a relationship between the image data and the object position, wherein a range-finding point is designated in the image data used in the training process,
creates a trained model for an automatic focal point adjustment that specifies an object from the image data to specify a focal position, and
outputs the trained model to a device requesting the trained model;
a terminal apparatus that acquires the trained model from the information processing apparatus; and
an electronic device that:
acquires the trained model from the terminal apparatus; and
performs the automatic focal point adjustment based on the trained model.

15. An information processing system, comprising:
an information processing apparatus that:
collects image data,
uses a plurality of the collected image data to extract an object position included in the image data,
performs a training process regarding a relationship between the image data and the object position, wherein a range-finding point is designated in the image data used in the training process,
creates a trained model for an automatic focal point adjustment that specifies an object from the image data to specify a focal position, and
outputs the trained model to a device requesting the trained model; and
an electronic device that:
acquires the trained model from the information processing apparatus; and
performs the automatic focal point adjustment based on the trained model.

16. An information processing method, comprising:
collecting image data;
using a plurality of the collected image data to extract an object position included in the image data;
performing a training process regarding a relationship between the image data and the object position, wherein a range-finding point is designated in the image data used in the training process;
creating a trained model for an automatic focal point adjustment that specifies an object from the image data to specify a focal position; and
outputting the created trained model to a device requesting the trained model.

17. A non-transitory computer-readable medium having stored thereon, computer-executable instructions which, when executed by a computer, cause the computer to execute operations, the operations comprising:
collecting image data;
using a plurality of the collected image data to extract an object position included in the image data;
performing a training process regarding a relationship between the image data and the object position, wherein a range-finding point is designated in the image data used in the training process;
creating a trained model for an automatic focal point adjustment of an electronic device that specifies an object from the image data to specify a focal position; and
outputting the created trained model to a device requesting the trained model.

* * * * *